United States Patent [19]

Tsai

[11] 4,257,476
[45] Mar. 24, 1981

[54] MANIFOLD REGENERATION FLUES FOR REGENERATIVE FURNACES

[75] Inventor: Yih-Wan Tsai, Pittsburgh, Pa.

[73] Assignee: PPG Industries, Inc., Pittsburgh, Pa.

[21] Appl. No.: 25,139

[22] Filed: Mar. 29, 1979

[51] Int. Cl.$^3$ .............................................. F28D 17/04
[52] U.S. Cl. ......................................... 165/9.3; 65/337
[58] Field of Search .................... 165/9.3, 9.1, 9.2, 9.4; 65/337

[56] References Cited

U.S. PATENT DOCUMENTS

| | | | |
|---|---|---|---|
| 2,834,406 | 5/1958 | Otto | 165/9.3 X |
| 4,047,560 | 9/1977 | Tsai | 165/9.3 |

FOREIGN PATENT DOCUMENTS

| | | | |
|---|---|---|---|
| 2407327 | 8/1974 | Fed. Rep. of Germany | 165/9.3 |
| 711554 | 7/1954 | United Kingdom | 165/9.3 |

Primary Examiner—Albert W. Davis
Attorney, Agent, or Firm—Dennis G. Millman; Paul A. Leipold

[57] ABSTRACT

In a regenerative furnace of the type used for melting glass, localized overheating of the regenerating regenerator packing is minimized and heating of the regenerator packing is made more uniform by the utilization of a manifold flue. The gas distribution space is in continuous contact with the regenerator packing while the manifold flue is joined to said gas distribution space at a plurality of points below the regenerative packing. Further, flow control dampers may be located in the flue between the regenerative packing and the joining point of the manifold flue and another damper may be in the manifold flue itself to regulate the passage of gas to and from the regenerative packing so that the packing is evenly heated or cooled.

7 Claims, 11 Drawing Figures

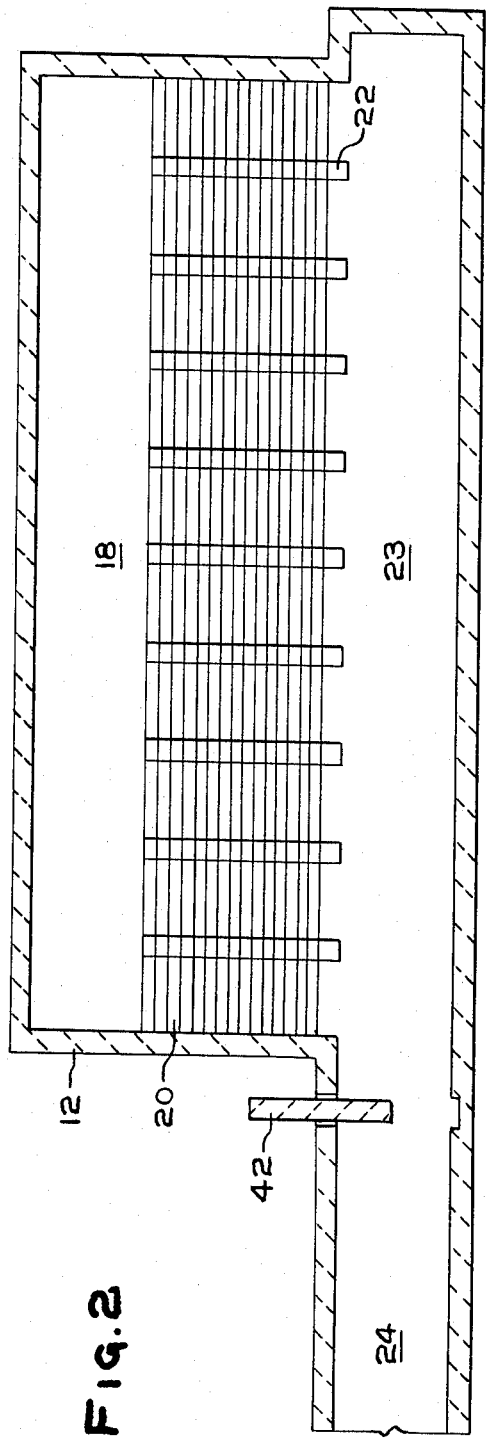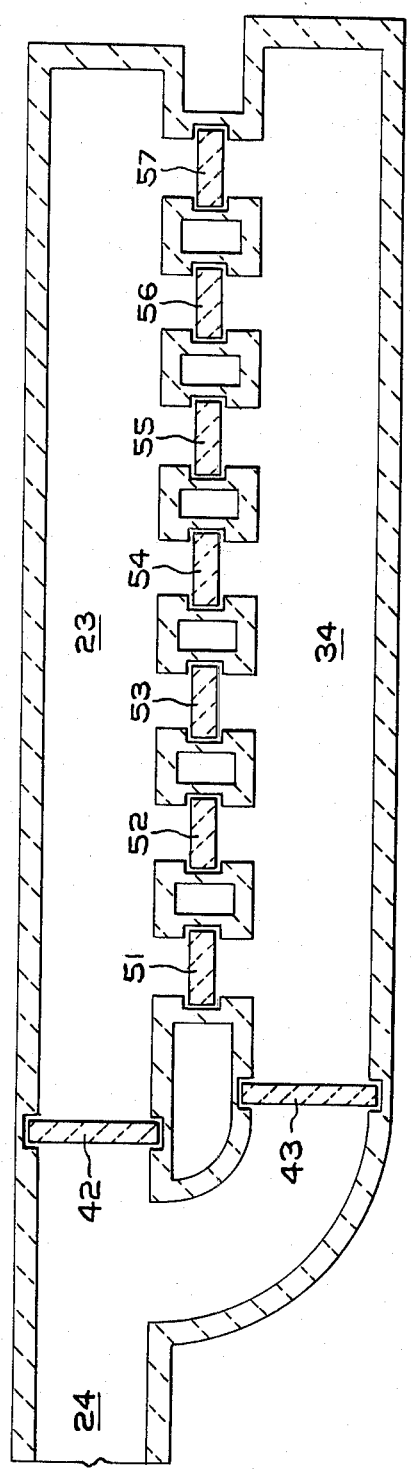

Prior Art
F1G.4A
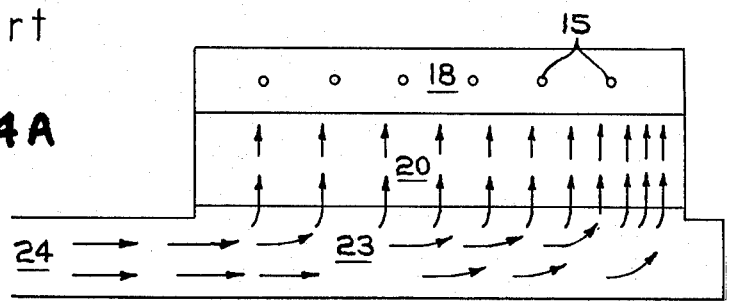
F1G.4B
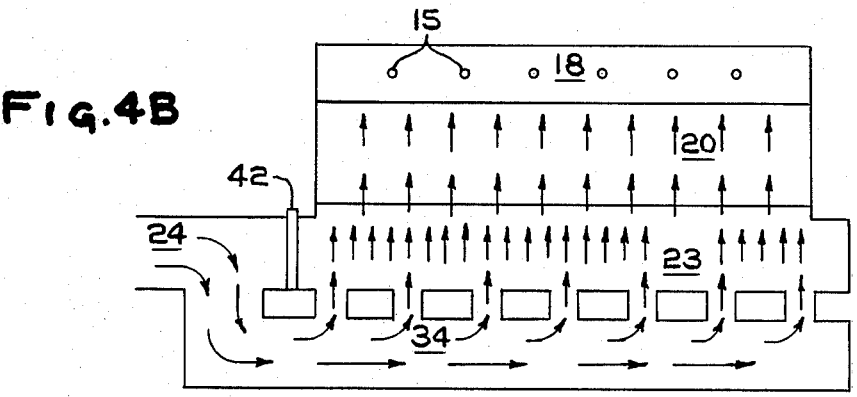
Prior Art
F1G.5A
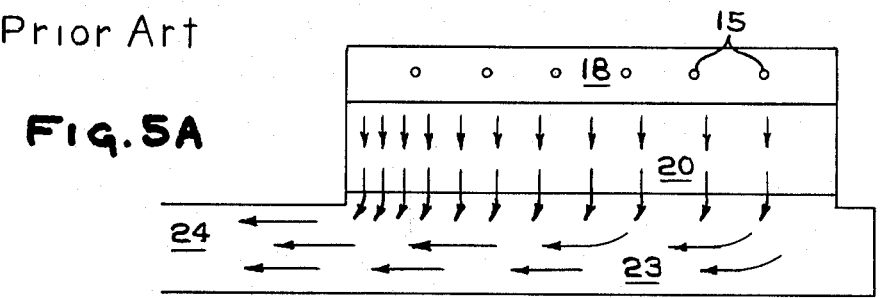
F1G.5B
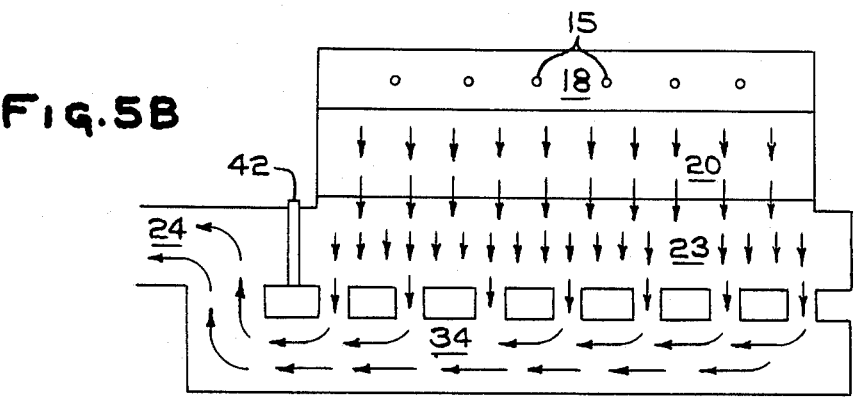

MANIFOLD REGENERATION FLUES FOR REGENERATIVE FURNACES

BACKGROUND OF THE INVENTION

This invention relates to regenerative furnaces and their operation, and in particular to the type of regenerative furnace commonly employed in the manufacture of flat glass. The invention particularly concerns the control of flow of gases through the flues to and from the checker packing material of the regenerators.

1. Field of the Invention

Because side fired flat glass furnaces typically include a relatively large number of burner ports (usually about four to eight on each side) spaced several feet apart from one another, the length of a regenerator bed associated therewith usually has a length which is several times greater than its width. And because of construction expediencies, the main flue carrying gases to and from each regenerator is usually located at one end of the regenerator. This arrangement unfortunately sets up lateral flow in the upper plenum and therefore an uneven flow distribution in the regenerator packing during the exhaust cycle, which has been found to cause the portion of the packing near the flue to become hotter than other portions of the packing. This localized overheating may often be reinforced in the subsequent firing cycle, during which the flow of incoming air has been detected favoring the end of the packing away from the flue so that the flue end is cooled less than the remainder of the packing. As a result, the flue end portion of the packing tends to deteriorate faster than others, thereby shortening furnace life. Furthermore, because the stored heat is concentrated in one portion of the packing, the efficiency with which air is preheated in the firing cycle is reduced. It is an object of the present invention to overcome these disadvantages.

2. Prior Art

U.S. Pat. Nos. 1,836,412 and 2,813,708 relate to modifying the flow patterns in regenerators. Both employ rigid baffles designed primarily for the purpose of rendering the air flow through the checker packing more uniform during the firing cycle. It is not apparent, however, how such arrangements could sufficiently influence flow in the opposite direction through the packing during the exhaust cycle to avoid concentrating heat at the flue end of the packing. Moreover, such baffle arrangements could change the gas flow pattern in the space beneath the packing during the exhaust cycle, thereby promoting lateral flow of the exhaust gases along the plenum above the packing and then into the packing at the flue end.

In U.S. Pat. No. 4,047,560 to Tsai it has been suggested that the difficulty of overheating of the upstream portion of the packing of the regenerator be minimized by the use of a movable baffle beneath the packing near the flue entrance to the regenerator. The baffle would deflect a substantial portion of the incoming airflow during the firing cycle into the portion of checker packing nearest the flue and thereby preferentially cool that portion. When the cycle is reversed, the baffle would be retracted so as to not interfere with normal gas flow pattern. Since the flue end of the packing will thereby have been cooled more than other portions during the firing cycle, the subsequent uneven flow of the exhaust gases will not cause an excessively unbalanced temperature raise at the flue end. Thus the inordinate concentration of the heat at the flue end is reduced and thermoenergy more efficiently utilized. It is also suggested in U.S. Pat. No. 4,047,560 that baffles would also be placed in the plenum above the packing so as to discourage lateral flow along the plenum during the exhaust cycle thereby alleviating the channeling of the exhaust gases to the packing of the flue end. The baffles in the plenum would be permanent. The construction utilizing a movable baffle while effective in minimizing the problem of overheating of the upstream checker portion does not completely effectively make possible the utilization of the maximum heat exchange capacity of the entire checker system. Further baffles in the upper plenum while restricting somewhat the flow of gases in the plenum also limit the firing arrangements which may be effectively made in the furnace as the air supplied to the burners is limited by the plenum baffles. Another disadvantage of the system of U.S. Pat. No. 4,047,560 is that the movable baffle requiring adjustment for each change of firing cycle presents a difficult materials usage in view of the size of the plate which must be moved and the reducing and oxidizing atmospheres to which it is subjected. Further, failure of the moving mechanism can create difficulties in overheating of the checkers in certain portions.

Therefore, there remains a need for a regenerator design which will provide even high temperature heating of the regenerator checkers for maximum heat recovery. As set forth above the flow over the checkers is not uniform. Therefore, less heat may be recovered from the downstream checkers than the upstream checkers as the temperature of these checkers is less. There remains a need for a flue design that would allow maximum recovery of regenerator heat and at the same time eliminate the possibility of over heating portions of the checker system. Further, there is a need for flue design which would not be blocked by a collapse of an arch holding the checker packing above the flue.

RELATED APPLICATION

In co-pending application titled "Two Regenerator-Flue System For Regenerative Furnaces" by Y. W. Tsai and R. Duffus now Ser. No. 25,140 filed Mar. 29, 1979, it has been proposed that the difficulty of overheating of portions of the regenerative packings be overcome by the provision of a second bypass flue which would join the air distribution space below the regenerative packings at the opposite end from the main flue. While this system is of desirable design, it has the disadvantage that the system is not always possible of installation in existing furnaces as the area downstream of the air distribution space below the regenerative packings is not available for utilization in the second bypass flue. The area is either taken up with other equipment, necessary to provide passage around the area under the furnace or not available for other reasons. Therefore, there remains a need for a system of flue design which would be suitable for addition to existing regenerator systems.

SUMMARY OF THE INVENTION

It is therefore an object of this invention to overcome the disadvantages of the prior regenerators.

It is a further object of this invention to provide a more efficient glass furnace.

It is another object of this invention to provide even temperatures along the length of regenerator packings.

It is another object of the invention to protect checker packings from collapse.

It is another object of this invention to provide a system of gaseous flow control in regenerator packings that does not require regulation between intake and exhaust cycles of the furnace.

It is a further additional object of this invention to increase the amount of heat which may be recovered and utilized by regenerator packings.

These and other objects of the invention are generally accomplished by the provision of at least one manifold flue lying substantially parallel with the present main gas distribution space of a glass furnace. The generally parallel manifold flue is then joined at a plurality of locations with the gas distribution spaces below the regenerator packing In another embodiment of the invention, the manifold flue is joined to the main flue in such a manner that either the existing main entry flue or the generally parallel manifold flue may be utilized in the operation of the furnace.

In a particularly preferred embodiment, a single second manifold flue is located beside the existing gas distribution space beneath the regenerative packing and is joined to the gas distribution space by a damper controlled connection below each firing port of the furnace. Further the manifold flue also is joined to the main flue in such a manner that the main flue may be directly joined with the gas distribution space or the combustion air and exhaust gases may be balanced between the manifold flue and the original entrance way to the original gas distrubution space.

It is again another object of this invention to create a flue system adaptable to improving gas flow to the regenerative packing of existing glass forming furnaces.

BRIEF DESCRIPTION OF THE DRAWINGS

FIG. 2 is a vertical section of a regenerator according to the invention taken along line 2—2 of FIG. 1.

FIG. 3 is a horizontal cross-section of the flue section of a regenerator taken along the line 3—3 of FIG. 1.

FIG. 4A is a representative schematic drawing of the gaseous flow during the intake cycles of a regenerator prior to modification in accordance with the instant invention.

FIG. 4B is a representative schematic drawing of the gaseous flow during the exhaust cycle of a glass furnace of the invention.

FIG. 5A is a representative schematic drawing of the gaseous flow during the exhaust cycle of a glass furnace prior to modification in accordance with the instant invention.

FIG. 5B represents a schematic drawing of the gaseous flow during the exhaust cycle of a glass furnace of the invention.

DETAILED DESCRIPTION OF THE INVENTION

The construction and operating method of the regenerator of the invention allows numerous advantages over present conventional construction. Among other advantages are that it prevents overheating of checker packing by the concentration of airflow through the checkers. Further it does not requires adjustment between exhaust and intake cycles of any devices in the flue. Another advantage is that by allowing greater heat recovery in the checker packing a greater output of glass may be obtained in the furnace. Further the efficiency of the furnace is improved by the additional heat capacity of the checkers as that fuel efficiency is gained. A further understanding of how these advantages are achieved will become apparent from the description of the drawings below.

Figure 1A:
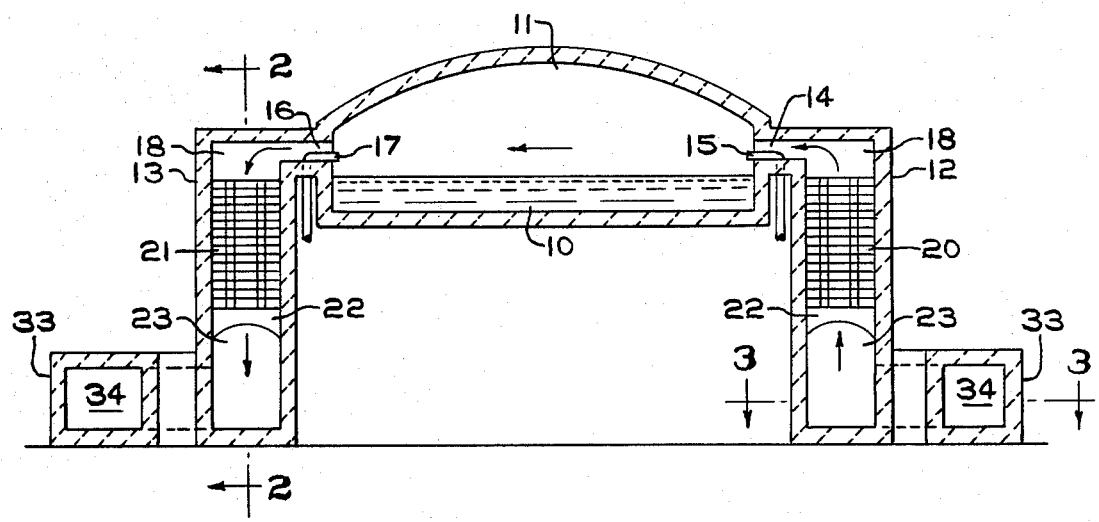
FIG. 1A is a schematic, vertical section across the width of cross-fired, regenerative, glass melting furnace showing a preferred location of the second bypass flue.
Figure 1B:
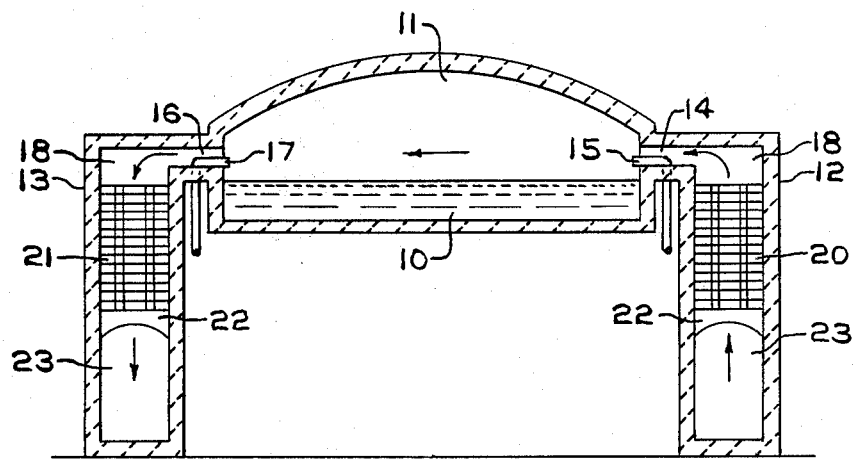
FIG. 1B is a schematic, vertical section across the width of a cross-fired, regenerative, glass melting furnace of the prior art.

The regenerative furnace shown in FIG. 1B is typical of the melting furnaces used in the flat glass industry. It should be understood that while glass furnaces are being described as illustrative examples, the invention is applicable to regenerative furnaces of other types. In FIG. 1B, a pool of molten and partially melted glass 10 is contained in a melting zone 11 which also serves as the combustion chamber. Regenerators 12 and 13 flank the combustion chamber and communicate therewith by means of a plurality of burner ports 14 and 16, respectively. Fuel is supplied by burners 15 or burners 17. Air for combustion passes upwardly through regenerator 12, where it is preheated by passing over a hot, gas-pervious, brickwork checker packing bed 20 made of refractory materials, and then through ports 14 where it combines with fuel from the pipe 15 at the mouth of each port. Flames issue a considerable distance into combustion chamber 11, and hot exhaust gases pass through ports 16 and into the opposite regenerator 13, where the exhaust gases heat another brickwork checker packing 21. The mode of operation shown in FIG. 1B is a firing cycle with respect to regenerator 12 and an exhaust cycle with respect to regenerator 13. After several minutes of operation, the flows are reversed so that regenerator 13 serves to preheat combustion air, and flames issue from left to right from ports 16 in FIG. 1B. Regenerator 12 would then be in an exhaust cycle. After a few more minutes the direction of firing is again reversed, and so on.

Typical flow patterns through the checker packing prior to the present invention may be seen in FIGS. 2 and 3, of U.S. Pat. No. 4,088,180 hereby incorporated by reference, where lengthwise cross-sections of regenerator 12 shown. FIGS. 4A and 5A of the instant application also show in less detail the gas flow in a conventional regenerator. It can be seen in FIGS. 2 and 3 of U.S. Pat. No. 4,088,180 that checker packing 20 rests upon arches 22, leaving an air distributing space 23 below, which is open at one end to a flue 24. A plenum 18 above the packing communicates with a number of burner ports 14. The regenerator is shown serving seven burner ports, a typical number in a large flat glass melting furnace, but the number could be greater or smaller. FIG. 2 of U.S. Pat. No. 4,088,180 depicts an approximation of the flow pattern during an exhaust cycle without the improvement of the present invention. A portion of the exhaust gases tend to be drawn laterally along the plenum, toward the flue end of the regenerator, and then down into the packing near that end. The resulting greater amount of exhaust gas flowing through the flue end of the packing causes that portion of the packing to become hotter than the remainder of the packing. However, in the firing cycle when flows are reversed FIG. 3 of U.S. Pat. No. 4,088,180, the air flow through the packing, and therefore the cooling effect, has been found to be somewhat biased toward the opposite end from the flue. As a result, the checker packing near the flue end has been found to continually remain at a higher temperature than the rest of the packing. The region of this inefficient and sometimes harmful concentration of heat is, of course, not discrete, and it depends upon the particular configuration of a regenerator, but it can be said to generally consist of about the first one-third of the packing from the flue end.

A preferred embodiment of the regenerator of the invention is shown in FIG. 1A, FIG. 2 and FIG. 3. The regenerator flue system of the invention comprises the addition of a manifold flue joining or replacing the main or original flue 24 at a point prior to the contact of the main flue 24 with the gas distribution space at 23. The manifold flue 34 then extends generally parallel to the regenerator or checker packing. In this specification the term "checker packing" and "regenerator packing" are used interchangeably and are intended to refer to any heat exchange medium comprising a gas-pervious bed of refractory material through which the air for the intake and exhaust cycles of a furnace pass. Within the flue 24 between the point of contact with the manifold flue and the air distribution space 23 in contact with the regenerator packing is located a gas flow control means 42. As illustrated, the gas control means 42 is a vertical cut-off or gate which is dropped by hoist means (not shown) into the flue to direct the gases into the manifold flue. Another gas control means 43 is illustrated in the second manifold flue 34. The gas control means 43 is illustrated as a vertically moving gate which may be inserted to a desired distance into the manifold flue by hoist means (not shown).

Joining the manifold flue 34 with the air distribution space 23 are, as illustrated in FIG. 3, seven control means 51, 52, 53, 54, 55, 56 and 57. These control devices illustrated as vertically moving gates are utilized to balance the gas flow entering the gas distribution space such that the regenerator packings are heated or cooled relatively evenly by the exhaust gases and entering air for combustion. The gates from the manifold to the air distribution space are illustrated as located generally below each firing port of the furnace. It is of course within the invention that the number of control gates may be somewhat fewer or even a greater number depending on the amount of control desired and the space limitations at a particular furnace. The gates separating the air distribution space and the manifold flue are adjusted generally by trial and error to achieve a generally uniform temperature in the regenerator packings. Temperatures in the regenerator packings may be measured by insertion of thermocouples. Once the generally even temperatures are achieved, the gates may be positioned permanently until the firing cycle of the furnace is varied.

Figure 6:
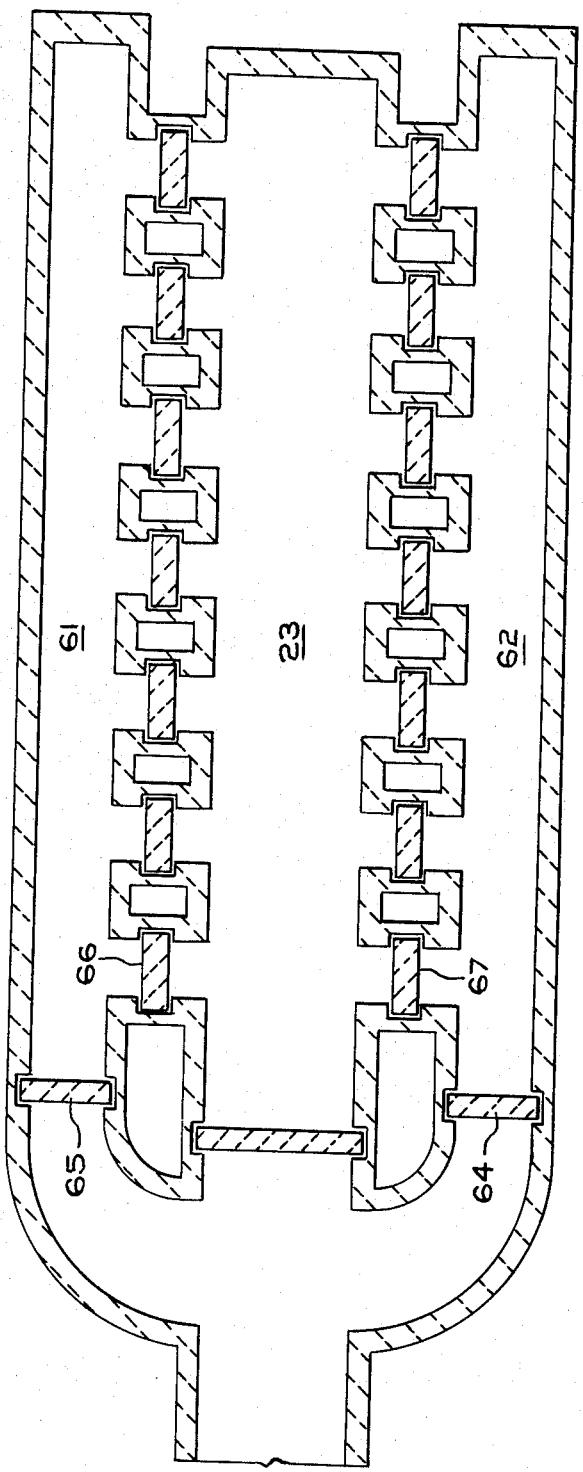
FIGS. 6, 7 and 8 are alternate constructions of regenerator flues in accordance with the invention.
Figure 7:
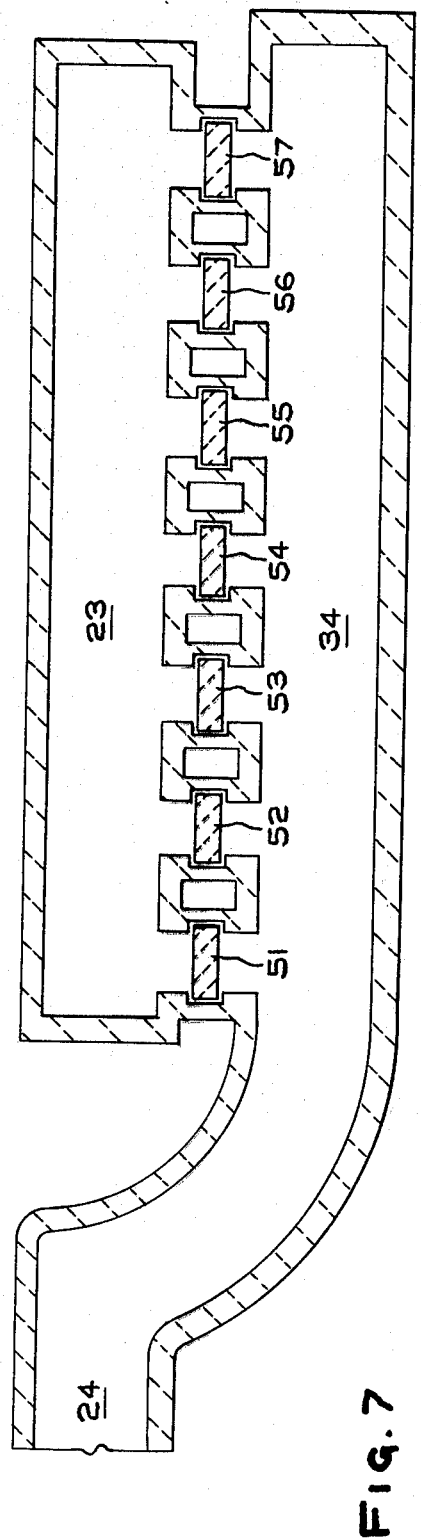
Figure 8:
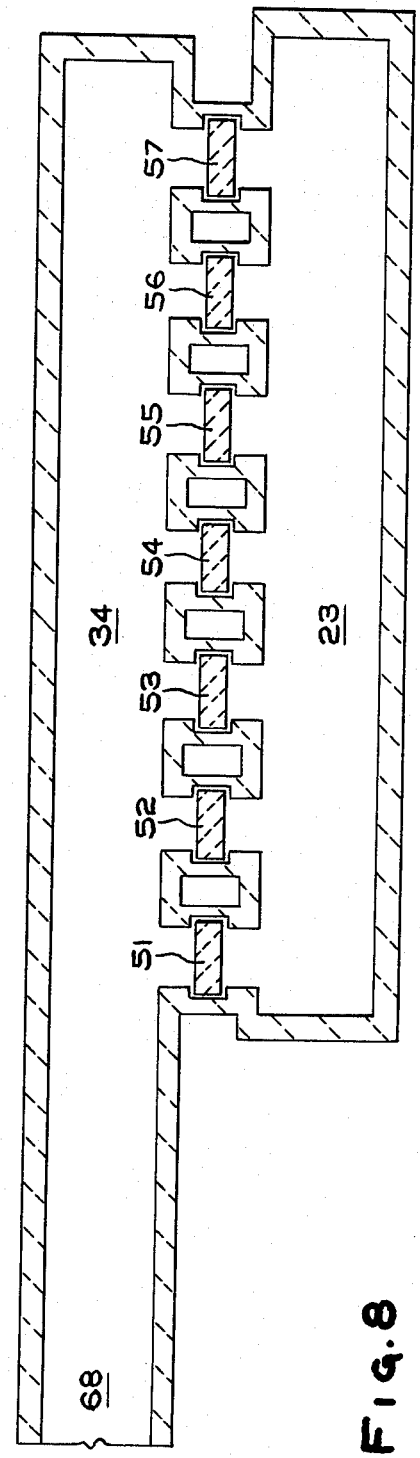

While the construction of FIG. 3 is a preferred embodiment in that great flexibility is possible because of gates 42 and 43 which allow great variation in the way the flue gases are carried to and from the furnace, there are other alternate embodiments which are possible. Such alternate embodiments are illustrated in FIGS. 6, 7 and 8 which are alternate manifold flud constructions which may be added to existing glass furnaces without extending into the space downstream from the existing regenerator packing. FIG. 7 is similar to FIG. 3, however, the control means 42 and 43 are not utilized and the control of the flue gases is only possible through control gates 51 through 57, joining the manifold 34 with the air distribution space 23. This structure is desirable in that the complication of gates 42 and 43 is removed, opening more space beneath the furnace. Further the expense of the control means for gates 42 and 43 is removed. These control means would seldom be utilized in any instance although their presence is useful in that the manifold flue may be shut-off for cleaning or reconstruction when gate 42 is raised.

FIG. 6 illustrates an alternate arrangement of flues in which two smaller manifold flues are arranged one on each side of the existing air distribution space 23. The smaller flues 61 and 62 in some instances leave better accessibility to the furnace basement area while permitting extensive control of the gases passing to and from the air distribution space 23. The construction is more extensive requiring many more control means such as at 64 and 65 and the smaller control gates such as 66 and 67. FIG. 8 is a variation similar to FIG. 7 only involving more construction in that the original flue 24 is removed at a greater distance such that the manifold flue 34 leads directly into a newly constructed flue 68 without the curve shown in FIG. 7 and FIG. 3. The FIG. 8 configuration gives good furnace access by removing the original flue.

While the control devices have been indicated as gates or fences which are inserted into the gas flow the purpose could also be accomplished by utilization of swinging baffles as in U.S. Pat. No. 4,088,180. However, such baffles are more complicated in operation and are not necessary for the instant process as the gas flow is not regulated by the flow devices for each regenerative cycle of the furnace. Devices such as shown are simple in operation and the material problem is much simpler than for devices subjected to torsional forces. It is further within the concept of the invention that the gas flow control devices would not be in the form of knives or gates but would be stacks of refractory brick in the flue or manifold to cut down a certain portion of the manifold or flue. Such stacks could be made and changed when desired through access holes in the flue. Use of such stacks rather than gates is considered possible after the needs of a particular furnace had been established and it was running at a constant throughput for a long period of time. While the barriers of the invention are referred to as movable it is understood that the invention comprehends barriers which are movable only with difficulty or which are not movable at a rapid rate.

Illustrated in FIGS. 4A and 4B is the effect of changing to the manifold flue system in the intake or firing cycle of a regenerator. Illustrated in 4A is operation with the prior art regenerator with gaseous flow as obtained in the conventional furnace. Illustrated in 4B is operation with the manifold flue of the invention with gates 51, 52, 53, 54, 55, 56 and 57 adjusted to give even flow through the regenerator.

Thus the flow of FIG. 4B illustrates generally even flow across the regenerator for maximum recovery of heat in the regenerator and even application of heated gases to the burners. In certain instances it might be desirable to not have even flow across the regenerator. The instant system would allow regulation to achieve increased flow at either end or a generally even flow across the checkers. Uneven flow might be desirable in instances where the regenerator packing had more heat carrying capacity due to different materials at a certain portion or if baffles where present in the plenum 18 and heavier firing was being carried out at a certain portion of the furnace such as the initial three ports at the upstream end.

Illustrated in FIGS. 5A and 5B are representations of gas flow during an exhaust cycle of regenerators of the prior art and the instant invention. As illustrated in FIG. 5A, the gas flow in conventional furnaces is concentrated at the upstream end of the furnace. The concentration of heat at the upstream end as above set forth can lead to collapse of a portion of the checkers due to overheating and also does not lead to complete heat recovery. Illustrated in FIG. 5B is flow balanced generally uniformly across the regenerator area by the use of the manifold flue of the instant invention.

As stated above in regard to the firing cycles the instant system of multiple gates allows regulation to concentrate flow in a certain area of the regenerator if desired. Such uneven flow across the regenerator might be desirable because of uneven heat storage ability of various materials in different portions of the regenerator or because of collapsing or plugging of a portion of the regenerator which could be compensated for by changing of the flow patterns by regulation of the gates.

It should be noted that the gates do not need to be adjusted between firing and exhaust to achieve generally even flow across the regenerator. Further, the gas flow regulating means 42 and 43 may not be necessary as all desired regulation may be carried out with the regulating means in the manifold flue, as shown in FIGS. 7 and 8.

Although this invention has been described with reference to particularly preferred embodiments, those skilled in the art will recognize that variations may be made in the practice of the invention. For instance, while the invention has been described with reference to float glass furnaces the concept is applicable to other regenerative firing furnaces such as those of steel making and bottle glass formation. Further, while the illustration of the manifold flue has been beside the original flue it is also within the invention to place the manifold flue beneath the original flue. Further, although the flues have been shown of approximately equal size it of course would be possible to vary the sizes to suit different flow requirements of a particular furnace as shown by FIG. 6.

Accordingly this disclosure is intended to be illustrative rather than limiting. For instance, while the flues have been illustrated as of generally square construction they could be formed of rectangles or circular cross-section if desired. The breadth of the invention is defined by the claims attached hereto.

I claim:

1. In a regenerative furnace of the type comprising a combustion chamber, a pair of regenerator chambers, a plurality of burner ports spaced along the sides of the combustion chamber providing for alternate passage of air and exhaust gases between the combustion chamber and the regenerator chambers; each regenerator chamber including an internally unpartitioned, gas pervious bed of refractory material in communication along one side with the ports, and an elongated, unitary gas distributing space in communication with substantially the entire opposite side of the gas pervious bed; the improvement comprising: a manifold flue in communication with the gas distributing space by way of a plurality of passages spaced apart along the length of the gas distributing space, including a passage near each end of the gas distributing space and at least one passage intermediate the end passages 2. The furnace of claim 1 wherein each of the passages between the gas distributing space and the manifold flue is provided with damper means for controlling gas flow therethrough.

3. The furnace of claim 1 wherein a main flue communicates with one end of the gas distributing space, and the main flue is provided with damper means to control gas flow between the main flue and the gas distributing space.

4. The furnace of claim 3 wherein the manifold flue communicates with the main flue, and the manifold flue is provided with damper means for controlling gas flow between the main flue and the manifold flud.

5. The furnace of claim 1, 2 or 4 wherein the burner ports communicate with the gas pervious bed by way of an elongated, common plenum extending along the length of the gas pervious bed.

6. The furnace of claim 1 wherein each gas distributing space is in communication with a second manifold flue by way of a plurality of passages spaced apart along the length of the gas distributing space.

7. The furnace of claim 1 wherein there are an equal number of burner ports and passages.

* * * * *